United States Patent
Meegan et al.

(10) Patent No.: US 10,245,764 B2
(45) Date of Patent: Apr. 2, 2019

(54) MODIFIED RESIN SYSTEMS SUITABLE FOR LIQUID RESIN INFUSION

(71) Applicant: Cytec Industries Inc., Woodland Park, NJ (US)

(72) Inventors: Jonathan E. Meegan, Chester (GB); Olivia Denman, Greasby (GB); Marco Aurilia, Naples (IT)

(73) Assignee: Cytec Industries Inc., Woodland Park, NJ (US)

( * ) Notice: Subject to any disclaimer, the term of this patent is extended or adjusted under 35 U.S.C. 154(b) by 338 days.

(21) Appl. No.: 14/970,159

(22) Filed: Dec. 15, 2015

(65) Prior Publication Data

US 2016/0176083 A1   Jun. 23, 2016

(30) Foreign Application Priority Data

Dec. 18, 2014 (GB) .................................. 1422564.3

(51) Int. Cl.
| | | |
|---|---|---|
| C08J 5/24 | (2006.01) | |
| B29C 35/02 | (2006.01) | |
| B29C 45/02 | (2006.01) | |
| C08L 63/00 | (2006.01) | |
| B29C 45/00 | (2006.01) | |
| C08K 3/01 | (2018.01) | |
| B29C 45/14 | (2006.01) | |
| B29C 45/72 | (2006.01) | |
| C08G 59/50 | (2006.01) | |
| B32B 27/04 | (2006.01) | |
| B32B 27/18 | (2006.01) | |
| B32B 27/20 | (2006.01) | |
| B32B 27/26 | (2006.01) | |
| B32B 27/38 | (2006.01) | |
| B29K 63/00 | (2006.01) | |
| B29K 105/08 | (2006.01) | |
| B29K 105/16 | (2006.01) | |
| B29K 409/06 | (2006.01) | |
| B29K 509/08 | (2006.01) | |
| B29C 70/44 | (2006.01) | |
| B29C 70/48 | (2006.01) | |

(52) U.S. Cl.
CPC .......... *B29C 45/0001* (2013.01); *B29C 35/02* (2013.01); *B29C 45/0013* (2013.01); *B29C 45/14631* (2013.01); *B29C 45/7207* (2013.01); *C08G 59/50* (2013.01); *C08K 3/01* (2018.01); *C08L 63/00* (2013.01); *B29C 70/443* (2013.01); *B29C 70/48* (2013.01); *B29K 2063/00* (2013.01); *B29K 2105/0809* (2013.01); *B29K 2105/162* (2013.01); *B29K 2409/06* (2013.01); *B29K 2509/08* (2013.01)

(58) Field of Classification Search
None
See application file for complete search history.

(56) References Cited

U.S. PATENT DOCUMENTS

| | | | |
|---|---|---|---|
| 6,437,080 B1 | 8/2002 | McGrail et al. | |
| 7,084,213 B2 | 8/2006 | McGrail et al. | |
| 2004/0044141 A1 | 3/2004 | McGrail et al. | |
| 2007/0087202 A1* | 4/2007 | Simmons | B82Y 30/00 428/413 |
| 2010/0280151 A1 | 11/2010 | Nguyen et al. | |
| 2011/0151232 A1 | 6/2011 | Meegan et al. | |
| 2012/0146256 A1* | 6/2012 | Mortimer | B29B 13/02 264/257 |
| 2013/0206273 A1 | 8/2013 | Guest et al. | |
| 2013/0225788 A1* | 8/2013 | Meegan | C08G 59/38 528/408 |
| 2017/0326819 A1* | 11/2017 | Meegan | C08L 63/00 |

FOREIGN PATENT DOCUMENTS

| | | |
|---|---|---|
| WO | 2011077094 A1 | 6/2011 |
| WO | 2011077094 A9 | 6/2011 |
| WO | 2013070415 A1 | 5/2013 |

OTHER PUBLICATIONS

A. J. Kinloch et al., "The fracture of glass-fibre-reinforced epoxy composites using nanoparticle-modified matrices;" Journal of Material Science, vol. 43; pp. 1151-1154; 2008.

Y. L. Liang et al., "The toughening mechanism in hybrid epoxy-silica-rubber nanocomposites;" Elsevier, Polymer 51, pp. 4880-4890; 2010.

Y. L. Liang, et al., "Toughening Mechanisms in epoxy-silica nanocomposites (ESNs);" Elsevier, Polymer 50, pp. 4895-4905; 2009.

B. B. Johnsen et al., "Toughening mechanisms of nanoparticle-modified epoxy polymers;" Elsevier, Polymer 48, pp. 530-541; 2007.

Hui Zhang et al., "Property improvements of in situ epoxy nanocomposites with reduced interparticle distance at high nanosilica content;" Elsevier, Acta Materialia 54, pp. 1833-1842; 2006.

A. J. Kinloch et al., "The effect of silica nano particles and rubber particles on the toughness of multiphase hermosetting epoxy polymers;" Journal of Materials Science, 4 pages, Letters; 2005.

* cited by examiner

*Primary Examiner* — Michael J Feely
(74) *Attorney, Agent, or Firm* — Thi Dang

(57) ABSTRACT

A curable composition for liquid resin infusion (LRI) and a manufacturing process for producing a molded article. The curable composition includes:
   a) no more than 5.0 wt % of a thermoplastic polymer;
   b) no more than 5.0 wt % of nano-sized core-shell particles;
   c) no more than 5.0 wt % of nano-sized inorganic particles;
   d) an epoxy resin component; and
   e) one or more amine curing agent(s),
wherein the initial viscosity of said curable composition is no more than 5 Poise at a temperature within the temperature range of from about 80° C. to about 130° C.

23 Claims, 3 Drawing Sheets

MODIFIED RESIN SYSTEMS SUITABLE FOR LIQUID RESIN INFUSION

This application claims the benefit of United Kingdom Application No. 1422564.3 filed on Dec. 18, 2014, the disclosure of which is incorporated herein in its entirety.

The present disclosure relates to modified resin systems suitable for liquid resin infusion applications. The present disclosure further relates to processes for the preparation of a composite material derived from the modified resins, and applications thereof.

DETAILED DESCRIPTION

Figure 1:
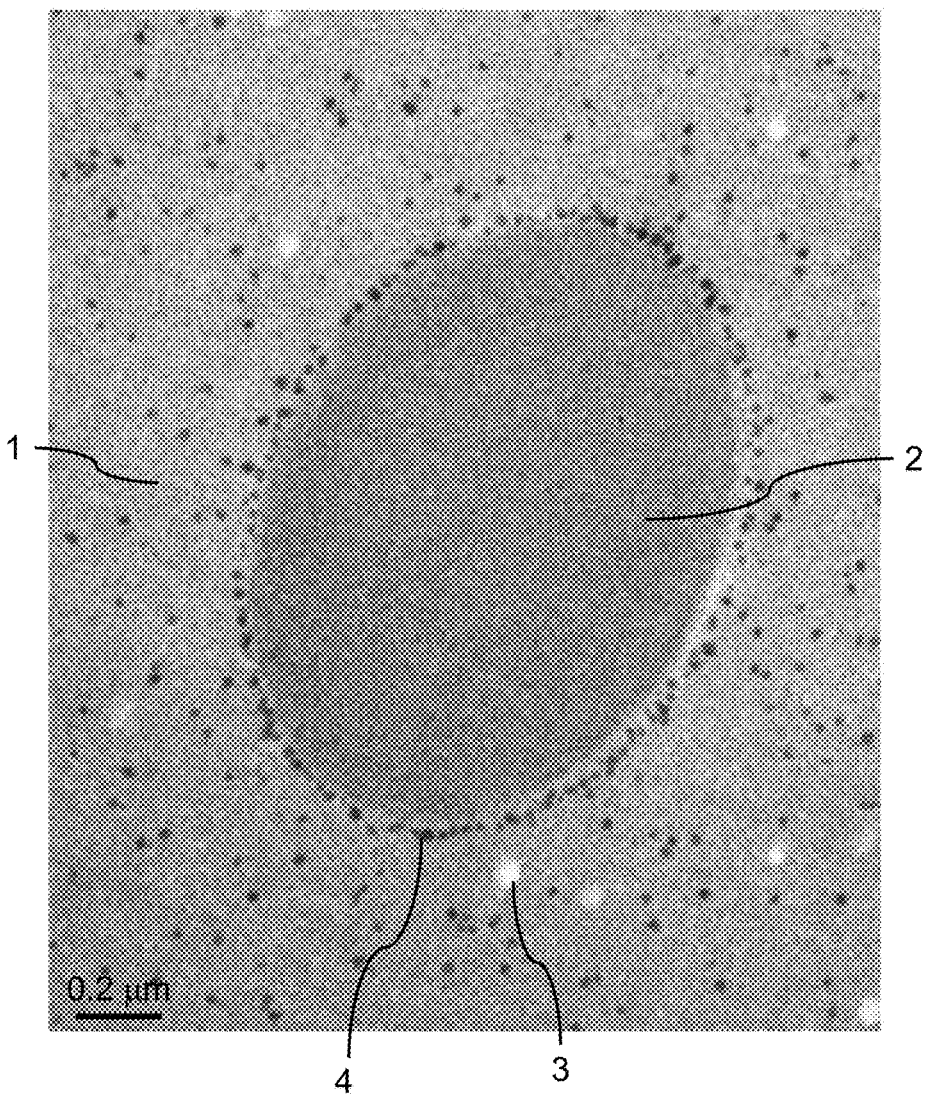
FIG. 1 shows the morphology a cured resin, in which inorganic particles (4) surrounds the outer surface of a phase separated thermoplastic domain (2).

Liquid resin infusion (LRI) is a process used to manufacture fiber-reinforced composite structures and components for use in a range of different industries including the aerospace, transport, electronics, and building and leisure industries. The general concept in LRI technology involves infusing resins into a fiber reinforcement, fabric or a pre-shaped fibrous reinforcement ("preform") by placing the material or preform into a mold (two-component mold or single-sided mold) and then injecting resin under high pressure (or ambient pressure) into the mold cavity or vacuum bag sealed single-sided mold. The resin infuses into the material or preform resulting in a fiber-reinforced composite structure. LRI technology is especially useful in manufacturing complex-shaped structures which are otherwise difficult to manufacture using conventional technologies. Variation of liquid resin infusion processes include, but are not limited to, Resin Infusion with Flexible Tooling (RIFT), Constant Pressure Infusion (CPI), Bull-Resin Infusion (BRI), Controlled Atmospheric Pressure Resin Infusion (CAPRI), Resin Transfer Molding (RTM), Seemann Composites Resin Infusion Molding Process (SCRIMP), Vacuum-assisted Resin Infusion (VARI) and Vacuum-assisted Resin Transfer Molding (VARTM).

In prepreg resin formulations, high levels of toughness are gene ally achieved through the addition of about 10 to 30 wt % of a thermoplastic toughener to the base resin. However, addition of such tougheners to LRI systems generally results in an unacceptable increase in the viscosity of the resin. In the specific case of particulate toughener, there may be additional filtering issues in the textile. These limitations render the addition of tougheners conventionally added in prepreg formulations generally unsuitable in conventional LRI applications where the balance of final part toughness and process viscosity of the LRI formulation are key technology drivers.

One technology to toughen fiber-reinforced composite structures manufactured by LRI technologies is to integrate the toughener into the preform itself. For example, a soluble toughening fiber may be directly woven into the preform thereby eliminating the need to add toughener into the resin which otherwise would increase the viscosity of the resin (rendering it unsuitable for resin infusion). Another example is the use of soluble or insoluble veils comprising of toughener used as an interleaf with the reinforcement of the preform. However, in either of these methods, the manufacturing process may be more complicated and costly, in addition to increasing the risk of hot/wet performance knock-downs and solvent sensitivity with a polymer based insoluble interleaf.

Another technology is the addition of particles to the resin. The amount of particles required to reach a suitable toughness threshold, however, is often high resulting in a viscous resin requiring a very narrow process window that is generally unfavorable for LRI. WO-2011/077094-A1 addresses these issues by providing a curable modified resin formulation comprising core-shell rubber particles or hollow particles in a carrier resin and further comprising a thermoplastic toughening agent, such that when cured the particles are uniformly dispersed throughout the resin.

However, it remains desirable to further improve the Compression Strength After Impact (CSAI), which measures the ability of a composite material to tolerate damage, while maintaining excellent hot-wet compressive performance (hot-wet open-hole compression (H/W-OHC) strength), which measures the way in which the open-hole compression (OHC) strength decreases at elevated temperatures after a prolonged exposure to moisture. The OHC strength of conventional composites is typically fairly constant below room temperature (for instance from room temperature (21° C.) down to about −55° C.) but can deteriorate significantly at elevated temperatures (for instance 70° C.) when saturated with moisture There also remains a need to further improve the processability of the curable composition in LRI processes, i.e. that the initial viscosity of the injected composition should be low and preferably also that the viscosity remains stable over time at an elevated processing temperature, thereby ensuring that the "pot-life" is maintained or extended.

It is therefore an object of this disclosure to provide a resin system which provides improved CSAI, and which exhibits excellent H/W OHC, preferably without detriment to processability and preferably with improved processability. It is a further object of this disclosure to provide a resin system which provides improved CSAI and which exhibits excellent H/W-OHC, preferably without detriment to processability and preferably with improved processability. It is a further object of this disclosure to provide a resin system with improved processability without detriment to CSAI and/or H/W-OHC and preferably with improved CSAI while retaining excellent H/W-OHC.

According to a first aspect of the present disclosure there is provided a liquid resin infusion (LRI) manufacturing process for producing a molded article, comprising the steps of providing a curable composition, injecting said curable composition into the mold, and curing said curable composition, wherein the curable composition comprises, consists essentially of, or consists of:

a) no more than 5.0 wt % of a thermoplastic polymer;
b) no more than 5.0 wt % of core-shell particles wherein said core-shell particles have a particle size in the range of from about 50 nm to about 800 nm;
c) no more than 5.0 wt % of inorganic particles wherein said inorganic particles have a particle size in the range of from about 2.0 nm to about 800 nm;
d) an epoxy resin component which is or comprises one or more epoxy re in precursor(s); and
e) one or more amine curing agent(s), wherein the initial viscosity of said curable composition is no more than 5 Poise at a temperature within the temperature range of from about 80° C. to about 130° C.

According to a second aspect of the present disclosure there is provided a curable composition which comprises, consists essentially of, or consists of:
a) no more than 5.0 wt % of a thermoplastic polymer;
b) no more than 5.0 wt % of core-shell particles wherein said core-shell particles have a particle size in the range of from about 50 nm to about 800 nm;
c) no more than 5.0 wt % of inorganic particles wherein said inorganic particles have a particle size in the range of from about 2.0 nm to about 800 nm;
d) an epoxy resin component which is or comprises one or more epoxy resin precursor(s); and
e) one or more amine curing agent(s), wherein the viscosity of said curable composition is no more than 5 Poise at a temperature within the temperature range of from about 80° C. to about 130° C.

In the curable composition of the second aspect of the disclosure, the thermoplastic polymer and the epoxy resin component preferably form a continuous phase.

Preferably, the viscosity of the curable composition is no more than about 2 Poise, preferably no more than about 0.5 Poise, and preferably no more than about 0.2 Poise, and typically at least about 0.1 Poise, at a temperature within the temperature range of from about 80° C. to about 130° C. (and preferably at all temperatures within said range). Preferably, the viscosity of the curable composition is no more than 5 Poise, preferably no more than about 2 Poise, preferably no more than about 0.5 Poise, and preferably no more than about 0.2 Poise, and typically at least about 0.1 Poise, at a temperature of 120° C.

It will be appreciated that these viscosity values for the curable composition when used in a liquid resin infusion process according to the first aspect of the disclosure refer to the initial viscosity of the composition, i.e. at the start of the cure cycle. After approximately 3 hours at a temperature within the temperature range of from about 80° C. to about 130° C. (preferably at all temperatures within said range, and preferably at a temperature of 120° C.), the viscosity of the curable composition is preferably no more than 5 Poise, preferably no more than 2 Poise, preferably no more than 1 Poise, preferably no more than 0.5 Poise, and typically at least 0.3 Poise, more typically at least about 0.4 Poise. Thus, it is preferred that not only should the initial viscosity be low but also that the viscosity be stable over time at an elevated processing temperature, in order to ensure that the pot-life maintained. As used herein, the term "elevated processing temperature" means above ambient temperature, and encompasses the temperature range of from about 80° C. to about 130° C.

According to a third aspect of the present disclosure, there is provided a cured molded article derived from the curable composition defined herein. Preferably, the molded article is a composite material further comprising reinforcing fibrous material.

Upon curing, the thermoplastic polymer typically phase-separates from the epoxy resin component into aggregate domains, each aggregate domain having an "island-like" morphology in a "sea" of epoxy resin. The morphology of the cured material evolves during the cure cycle. Such islands-in-the-sea morphology for cured thermoplastic-containing epoxy resin materials are well-known in the art. However, it has now been found that the curable compositions of the present disclosure generate a novel morphology by self-assembly of the combination of the inorganic particles and thermoplastic polymer during the cure of the epoxy resin. According to the present disclosure, the cured composition exhibits a self-assembled shelled morphology of inorganic particles around phase-separated thermoplastic polymer domains. In other words, the cured composition exhibits a self-assembled shelled morphology of inorganic particles around, but not within, phase-separated thermoplastic polymer domains. Thus, the cured composition exhibits a self-assembled shelled morphology of closely associated inorganic particles around, but not within, phase-separated thermoplastic polymer domains. In particular, a proportion of the inorganic particles are disposed around the periphery of the phase-separated (i.e. aggregate) domains of thermoplastic polymer such that said inorganic particles substantially surround said domain and form an inorganic rich zone. In cross-section, the inorganic particles of the self-assembled shelled morphology exhibit a ring-like structure which substantially surrounds the thermoplastic polymer domain and is reminiscent of a generic core-shell particle morphology. As used herein, the term "substantially surround" is not intended to infer a continuous coating of the thermoplastic polymer domain by the inorganic particles, but instead refers to semi-continuous or discontinuous arrangement of the inorganic particles around the domain, preferably such that at least 50%, preferably at least 60%, preferably at least 70%, preferably at least 80%, preferably at least 90%, preferably at least 95% of the outer surface of the thermoplastic polymer domain is proximate to one or more inorganic particle(s). As used herein, the term "proximate" means that any point on the outer surface of the thermoplastic polymer domain is within 100 nm, preferably within 50 nm of one or more inorganic particle(s). The skilled person will appreciate that the term "phase-separated thermoplastic polymer domains" refers to the islands-in-the-sea morphology of cured thermoplastic-containing epoxy resin materials.

Thus, in the molded articles of the present disclosure, the inorganic particles are not distributed uniformly throughout the cured resin. In contrast, the core-shell particles are distributed substantially uniformly throughout the cured resin in the molded articles of the present disclosure.

In the molded articles (particularly the composite materials) of the present disclosure, said self-assembled shelled morphology of inorganic particles around a phase-separated thermoplastic polymer domain has dimensions quantifiable in three orthogonal directions such that its dimension in at least one direction is greater than 1000 nm, and preferably its dimensions in at least two directions are greater than 1000 nm, and preferably its dimensions in all three directions are greater than 1000 nm. The dimensions may be assessed by any suitable technique familiar to those skilled in the art, for instance transmission electron microscopy (TEM). The self-assembled shelled morphology of inorganic particles around a phase-separated thermoplastic polymer domain is not present in or introduced into the curable composition as a preformed entity, because of the size-limiting and filtering effect of the preform used in LRI processes, and is instead self-assembled and generated during the curing cycle. In other words, said self-assembled shelled morphology of inorganic particles around a phase-separated thermoplastic polymer domain is generated in situ during the curing cycle.

The present inventors have found that the curable compositions of the present disclosure exhibit surprisingly improved processability, and the cured resin materials derived from the curable compositions exhibit surprisingly improved Compression Strength After Impact (CSAI) and at least retention of hot-wet open-hole compression (H/W-

OHC) strength), for instance relative to the materials disclosed in WO-2011/077094-A1. In particular, the introduction of the inorganic particles and the novel self-assembled shelled morphology results in significantly improved performance in the CSAI test, with a significant reduction in damage area and dent depth.

The curable compositions of the present disclosure are of particular use in the liquid resin infusion manufacturing processes.

Thermoplastic Polymer

The thermoplastic polymer functions as a toughening agent in the compositions described herein.

The curable composition comprises no more than 5.0 wt % of said thermoplastic polymer by weight of the curable composition, preferably no more than about 4.0 wt %, preferably no more than about 3.0 wt %, preferably no more than about 2.0 wt %, and preferably at least about 0.05 wt %, preferably at least about 0.1 wt %, preferably at least about 0.3 wt %, and typically from about 0.3 wt % to about 4.0 wt %, more typically from about 0.5 wt % to about 4.0 wt %.

The thermoplastic polymer preferably exhibits a glass transition temperature (Tg) of at least about 150° C., preferably at least about 160° C., preferably at least about 170° C., preferably at least about 180° C., and suitably at least about 190° C.

The thermoplastic polymer is preferably a thermoplastic aromatic polymer, preferably selected from polyarylethers, polyarylsulphides and polyarylsulphones and copolymers thereof, including polyarylethersulphones (PES), polyarylethersulphones (PEES), polyarylsulphide-sulphones and polyphenylene oxide (PPO). Said thermoplastic polymers may be used either alone or in combination. It will be appreciated that an essential feature of the thermoplastic aromatic polymer is the requirement that an aromatic group lies within, rather than pendant to, the polymer backbone. Aromatic groups which are pendant to the polymer backbone may optionally also be present in the thermoplastic aromatic polymer, provided that the polymer backbone comprises aromatic groups. As discussed further below, the aromatic groups within the polymer backbone may carry one or reactive pendant and/or end group(s). As used herein, the term "aromatic polymer" is a polymer wherein the mass fraction of aromatic groups that are linked together in the polymer is at least 51%, preferably at least 60%.

The aromatic groups of the thermoplastic aromatic polymer are preferably 1,4-phenylene, 1,3-phenylene, 1,4- or 2,6-naphthylene, and phthalimid-N-4-ylene. Of particular utility are phenylene groups, typically 1,4-phenylene.

Preferred thermoplastic aromatic polymers are polyarylether sulphones, for instance poly-1,4-phenylene-oxy-1,4-phenylene-sulphone; the polyether sulphone made from bisphenol A and dichlorodiphenyl sulphone; and poly-bis(1,4-phenylene)-oxy-1,4-phenylene-sulphone. A further preferred thermoplastic aromatic polymer is poly(p-phenylene sulphide). A further preferred thermoplastic aromatic polymer is poly(p-phenylene oxide).

The polyarylethersulphone thermoplastic polymer comprises ether-linked repeating units, optionally further comprising thioether-linked repeating units, the units being selected from:

and optionally from:

wherein:

Ar is phenylene:

n=1 to 2 and can be fractional:

a=1 to 3 and can be fractional and when a exceeds 1, said phenylene groups are linked linearly through a single chemical bond or a divalent group other than —SO$_2$— (preferably wherein the divalent group is a group —C(R$^9$)$_2$— wherein each R$^9$ may be the same or different and selected from H and C$_{1-8}$ alkyl (particularly methyl)), or are fused together, provided that the repeating unit —[ArSO$_2$Ar]$_n$— is always present in the polyarylethersulphone in such a proportion that on average at least two of said —[ArSO$_2$Ar]$_n$— units are in sequence in each polymer chain present, and wherein the polyarylethersulphone has one or more reactive pendant and/or end group(s), By "fractional" reference is made to the average value for a given polymer chain containing units having various values of n or a.

The phenylene groups in the polyarylethersulphones may be linked through a single bond.

The phenylene groups in the polyarylethersulphones may be substituted by one or more substituent groups, each independently selected from C$_{1-8}$ branched or straight chain aliphatic saturated or unsaturated aliphatic groups or moieties optionally comprising one or more heteroatoms selected from O, S, N, or halo (for example Cl or F); and/or groups providing active hydrogen especially OH, NH$_2$, NHR$^a$ or —SH, where R$^a$ is a hydrocarbon group containing up to eight carbon atoms, or providing other cross-linking activity especially benzoxazine, epoxy, (meth)acrylate, cyanate, isocyanate, acetylene or ethylene, as in vinyl, allyl or maleimide, anhydride, oxazoline and monomers containing unsaturation.

Preferably, the phenylene groups are meta- or para- (preferably para). A mixture of conformations (particularly meta- and para-conformations) may be present along the polymer backbone.

Preferably the polyarylethersulphone comprises a combination of —[ArSO$_2$Ar]$_n$— and —[Ar]$_a$— repeating units, linked by ether and/or thio-ether linkages, preferably by ether linkages. Thus, preferably the polyarylethersulphone comprises a combination of polyethersulphone (PES) and polyetherethersulphone (PEES) ether-linked repeating units.

The relative proportions of —[ArSO$_2$Ar]$_n$— and —[Ar]$_a$— repeating units is such that on average at least two —[ArSO$_2$Ar]$_n$— repeating units are in immediate mutual succession in each polymer chain present, and the ratio of —[ArSO$_2$Ar]$_n$— units to —[Ar]$_a$— units is preferably in the range 1:99 to 99:1, more preferably 10:90 to 90:10. Typically, the ratio [ArSO$_2$Ar]$_n$:[Ar]$_a$ is in the range 75:25 to 50:50.

The preferred repeating units in the polyarylethersulphones are:

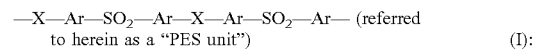 (I):

(referred to herein as a "PES unit")

and

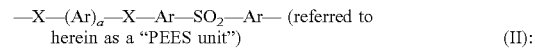 (II):

(referred to herein as a "PEES unit")

wherein:

X is O or S (preferably O) and may differ from unit to unit; and the ratio of units I:II is preferably in the range of from 10:90 to 80:20, more preferably in the range of from 10:90 to 55:45, more preferably in the range of from 25:75 to 50:50, and preferably the ratio I:II is in the range of from 20:80 to 70:30, more preferably in the range of from 30:70 to 70:30, most preferably in the range of from 35:65 to 65:35.

The preferred relative proportions of the repeating units of the polyarylethersulphone may be expressed in terms of the weight percent $SO_2$ content, defined as 100 times (weight of $SO_2$)/(weight of average repeat unit). The preferred $SO_2$ content is at least 22, preferably 23 to 25%, When a=1 this corresponds to PES/PEES ratio of at least 20:80, preferably in the range 35:65 to 65:35.

The flow temperature of polyetherethersulphone is generally less than that of a corresponding Mn polyethersulphone, but both possess similar mechanical properties. Accordingly the ratio may be determined, by determining values for a and n above.

U.S. Pat. No. 6,437,080, discloses processes for obtaining such compositions from their monomer precursors in a manner to isolate the monomer precursors in selected molecular weight as desired.

The above proportions refer only to the units mentioned. In addition to such units the polyarylethersulphone may contain up to 50% molar, preferably up to 25% molar, of other repeating units; the preferred $SO_2$ content ranges then apply to the whole polymer. Such units may be for example of the formula:

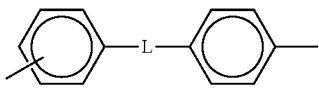

in which L is a direct link, oxygen, sulphur, —CO— or a divalent group (preferably a divalent hydrocarbon radical, preferably wherein the divalent group is a group —C($R^{12}$)$_2$— wherein each $R^{12}$ may be the same or different and selected from H and $C_{1-8}$ alkyl (particularly methyl)).

When the polyarylethersulphone is the product of nucleophilic synthesis, its units may have been derived for example from one or more bisphenols and/or corresponding bis-thiols or phenol-thiols selected from hydroquinone, 4,4'-dihydroxybiphenyl, resorcinol, dihydroxynaphthalene (2,6 and other isomers), 4,4'-dihydroxybenzophenone, 2,2'-di(4-hydroxyphenyl)propane and -methane. If a bis-thiol is used, it may be formed in situ, that is, a dihalide may be reacted with an alkali sulphide or polysulphide or thiosulphate.

Other examples of such additional units are of the formula:

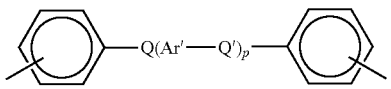

in which Q and Q', which may be the same or different, are CO or $SO_2$; Ar' is a divalent aromatic radical; and p is 0, 1, 2, or 3, provided that p is not zero where Q is $SO_2$. Ar' is preferably at least one divalent aromatic radical selected from phenylene, biphenylene or terphenylene. Particular units have the formula:

where q is 1, 2 or 3. When the polymer is the product of nucleophilic synthesis, such units may have been derived from one or more dihalides, for example selected from 4,4'-dihalobenzophenone, 4,4'bis(4-chlorophenylsulphonyl) biphenyl, 1,4,bis(4-halobenzoyl)benzene and 4,4'-bis(4-halobenzoyl)biphenyl. They may of course have been derived partly from the corresponding bisphenols.

The polyarylethersulphone may be the product of nucleophilic synthesis from halophenols and/or halothiophenols. In any nucleophilic synthesis the halogen if chlorine or bromine may be activated by the presence of a copper catalyst. Such activation is often unnecessary if the halogen is activated by an electron withdrawing group. In any event, fluoride is usually more active than chloride. Any nucleophilic synthesis of the polyarylethersulphone is carried out preferably in the presence of one or more alkali metal salts, such as KOH, NaOH or $K_2CO_3$ in up to 10% molar excess over the stoichiometric.

As noted above, the polyarylethersulphone contains one or more reactive pendant and/or end-group(s), and in a preferred embodiment the polyarylethersulphone contains two such reactive pendant and/or end-group(s). Alternatively, the polyarylethersulphone comprises one such reactive pendant- and/or end-group. Preferably, the reactive pendant- and/or end-groups are groups providing active hydrogen, particularly OH, $NH_2$, $NHR^b$ or —SH (where $R^b$ is a hydrocarbon group containing up to eight carbon atoms), or are groups providing other cross-linking activity, particularly benzoxazine, epoxy, (meth)acrylate, cyanate, isocyanate, acetylene or ethylene, as in vinyl, allyl or maleimide, anhydride, oxazaline and monomers containing saturation. In one embodiment, the reactive pendant- and/or end-groups are of formula -A'-Y wherein A' is a bond or a divalent hydrocarbon group, preferably aromatic, preferably phenyl. Examples of Y are groups providing active hydrogen, particularly OH, $NH_2$, $NHR^b$ or —SH (where $R^b$ is a hydrocarbon group containing up to eight carbon atoms), or groups providing other cross-linking activity, particularly benzoxazine, epoxy, (meth)acrylate, cyanate, isocyanate, acetylene or ethylene, as in vinyl, allyl or maleimide, anhydride, oxazaline and monomers containing saturation. The groups providing other cross-linking activity may be bound to the Ar groups of the polyarylethersulphone via a direct bond, or via an ether, thioether, sulphone, —CO— or divalent hydrocarbon radical linkage as described hereinabove, most typically via an ether, thioether or sulphone linkage. In a further embodiment, the end-groups, but preferably no more than a relatively minor proportion thereof, may be selected from halo groups (particularly chloro). Reactive end-groups may be obtained by a reaction of monomers or by subsequent conversion of product polymers prior to, or subsequently to, isolation. In one method for the introduction of reactive pendant and/or end-groups, for instance using activated aromatic halogenides (e.g. dichlorodiphenylsulphone) as the starting material for the polymer, the synthetic process utilises a slightly more than stoichiometric amount of the activated aromatic halogenide, and the resulting polymer having terminal halogenate groups is then reacted with an aminophenol (e.g. m-aminophenol) to create amino end groups.

The reactive pendant- and/or end-group(s) is/are preferably selected from groups providing active hydrogen, particularly OH and $NH_2$, particularly $NH_2$. Preferably, the polymer comprises two such groups.

The number average molar mass $M_n$ of the polyarylethersulphone is suitably in the range from about 2,000 to about 30,000, preferably from about 2,000 to about 25,000, preferably from about 2,000 to about 15,000, and suitably from about 3,000 to about 10,000 g/mol.

The synthesis of the polya lethersulphone is further described in US 2004/0044141 and U.S. Pat. No. 6,437,080.

Resin and Curing Agent

The curable composition comprises an epoxy resin component of one or more epoxy resin precursor(s). The epoxy resin component is a thermosetting epoxy resin component. The epoxy resin precursor preferably has at least two epoxide groups per molecule, and may be a polyfunctional epoxide having three, four, or more epoxide groups per molecule. The epoxy resin precursor is suitably liquid at ambient temperature. Suitable epoxy resin precursors include the mono- or poly-glycidyl derivative of one or more of the group of compounds consisting of aromatic diamines, aromatic monoprimary amines, aminophenols, polyhydric phenols, polyhydric alcohols, polycarboxylic acids and the like, or a mixture thereof.

Preferred epoxy resin precursors are selected from:

(i) glycidyl ethers of bisphenol A, bisphenol F, dihydroxydiphenyl sulphone, dihydroxybenzophenone, and dihydroxy diphenyl;

(ii) epoxy resins based on Novolacs; and (iii) glycidyl functional reaction products of m- or p-aminophenol, m- or p-phenylene diamine, 2,4-, 2,6- or 3,4-toluylene diamine, 3,3'- or 4,4'-diaminodiphenyl methane, particularly wherein the epoxy resin precursor has at least two epoxide groups per molecule.

Particularly preferred epoxy resin precursors are selected from the diglycidyl ether of bisphenol A (DGEBA); the diglycidyl ether of bisphenol F (DGEBF): O,N,N-triglycidyl-para-aminophenol (TG PAP); O,N,N-triglycidyl-meta-aminophenol (TGMAP); and N,N,N',N'-tetraglycidyl-diaminodiphenyl methane (TGDDM). For instance, the epoxy resin precursors may be selected from DGEBA and DGEBF and blends thereof. In a preferred embodiment, epoxy resin precursors are selected from DGEBF and TGPAP and blends thereof.

The epoxy group to amino hydrogen equivalent ratio is preferably in the range from 1.0 to 2.0. Formulations displaying an excess of epoxy are preferred to the exact stoichiometry.

Commercially available epoxy resin precursors suitable for use in the present disclosure include N,N,N',N'-tetraglycidyl diamino diphenylmethane (e.g. grades MY 9663, MY 720 or MY 721; Huntsman); N,N,N',N'-tetraglycidyl-bis(4-aminophenyl)-1,4-diiso-propylbenzene (e.g, EPON 1071; Momentive); N,N,N',N'-tetraclycidyl-bis(4-amino-3,5-dimethylphenyl)-1,4-diisopropylbenzene, (e.g., EPON 1072; Momentive); triglycidyl ethers of p-aminophenol (e.g. MY 0510; Hunstman); triglycidyl ethers of m-aminophenol (e.g. MY 0610; Hunstman); diglycidyl ethers of bisphenol A based materials such as 2,2-bis(4,4'-dihydroxy phenyl) propane (e.g. DER 661 (Dow), or EPON 828 (Momentive) and Novolac resins preferably of viscosity 8-20 Pa s at 25° C.; glycidyl ethers of phenol Novolac resins (e.g. DEN 431 or DEN 438; Dow); di-cyclopentadiene-based phenolic Novolac (e.g. Tactix 556, Huntsman); diglycidyl 1,2-phthalate (e.g. GLY CEL A-100); diglycidyl derivative of dihydroxy diphenyl methane (Bisphenol F) (e.g. PY 306; Huntsman). Other epoxy resin precursors include cycloaliphatics such as 3',4'-epoxycyclohexyl-3,4-epoxycyclohexane carboxylate (e.g. CY 179; Huntsman).

Preferably, the epoxy resin component is a blend of epoxy resin precursors having the same or different functionality (wherein the term "functionality" in this context means the number of functional epoxide groups). The blend of epoxy resin precursors may comprise one or more epoxy resin precursors having two epoxide groups per molecule (hereinafter referred to as precursor(s) P2), and/or one or more epoxy resin precursors having three epoxide groups per molecule (hereinafter referred to as precursor(s) P3), and/or one or more epoxy resin precursors having four epoxide groups per molecule (hereinafter referred to as precursor(s) P4). The blend may also comprise one or more epoxy resin precursors having more than four epoxide groups per molecule (hereinafter referred to as precursor(s) PP). For instance, only P3 precursor(s) are present. Alternatively, only P4 precursor(s) are present. Suitably, a blend of epoxy resin precursors comprises:

(i) from about 0 wt % to about 60 wt % of epoxy resin precursor(s) (P2);

(ii) from about 0 wt % to about 55 wt % of epoxy resin precursor(s) (P3); and (iii) from about 0 wt % to about 80 wt % of epoxy resin precursor(s) (P4).

In one embodiment, the blend comprises only one epoxy resin precursor of a given functionality, in the proportions noted above.

The curable compositions of the disclosure are thermally curable.

The composition comprises one or more amine curing agent(s). Such curing agents are known in the art, and include compounds having a molecular weight up to 500 per amino group, for example an aromatic amine or a guanidine derivative. An aromatic amine curing agent is preferred, preferably an aromatic amine having at least two amino groups per molecule. Examples include diaminediphenyl sulphones, for instance where the amino groups are in the meta- or in the para-positions with respect to the sulphone group. Particular examples of amine curing agents suitable for use in the present disclosure are 3,3'- and 4-,4'-diaminodiphenylsulphone (DDS); 4,4'-methylenedianiline (MDR); bis(4-amino-3,5-dimethylphenyl)-1,4-diisopropylbenzene; bis(4-aminophenyl)-1,4-diisopropylbenzene; 4,4'-methylenebis-(2,6-diethyl)-aniline (MDEA; Lonza): 4,4'-methylenebis-(3-chloro,2,6-diethyl)-aniline (MCDEA; Lonza); 4,4'methylenebis-(2,6-diisopropyl)-aniline (M-DIPA; Lonza); 3,5-diethyl toluene-2,4/2,6-diamine (D-ETDA 80; Lonza); 4,4'methylenebis-(2-isopropyl-6-methyl)-aniline (M-MIPA; Lonza); 4-chlorophenyl-N,N-dimethyl-urea (e.g. Monuron); 3,4-dichlorophenyl-N,N-dimethyl-urea (e.g. Diuron™); dicyanodiamide (Amicure™ CG 1200; Pacific Anchor Chemical); and 9,9 bis(aminophenyl)fluorenes such as 9,9 bis(3-chloro-4-aminophenyl)fluorene (CAF), 9,9-bis (3-methyl-4-aminophenyl)fluorene (OTBAF) and 9,9-bis(4-aminophenyl)fluorene. Preferably, the curing agents are selected from MCDEA, MDEA, MDA, 3,3'-DDS and 4,4-DDS, and preferably from MCDEA. MDEA and MDA.

The epoxy resin component and the amine curing agent are preferably present in the composition in amounts sufficient to provide a molar ratio of amine groups present in the curing agent:epoxy groups present in the epoxy component of from about 0.5:1.0 to about 1.0:0.5, preferably from about 0.75:1 to about 1:0.75, preferably from about 0.9:1.0 to about 1.0:0.9, typically the ratio is about 1:1.

The epoxy resin component and the curing agent(s) make up the bulk of the curable composition, and preferably make up the balance of the curable composition comprising the thermoplastic polymer, core-shell particles and inorganic particles. Preferably, the curable composition comprises at least about 40 wt %, preferably at least about 45 wt %, preferably no more than about 60 wt %, and preferably no more than about 55 wt %, and typically no more than about 50 wt % of the epoxy resin component, by weight of the curable composition. Preferably, the curable composition comprises at least about 30 wt %, preferably at least about 35 wt %, typically at least about 40 wt %, preferably no more than about 60 wt %, preferably no more than about 55 wt %, and typically no more than about 50 wt % of said one or more amine curing agent(s), by weight of the curable composition.

Core-Shell Particles

The curable composition comprises a plurality of core-shell particles, which function as toughening agents. Core-shell particles comprise an inner core portion and an outer shell portion which substantially encases the inner core portion. The core portion is preferably a polymeric material having an elastomeric or rubber property, i.e. a relatively low glass transition temperature (particularly relative to the material of the outer shell portion) and preferably less than about 0° C., e.g. less than about −30° C. The outer shell portion is preferably a glassy polymeric material, i.e. a thermoplastic or cross-linked thermoset polymer having a glass transition temperature greater than ambient temperature (20° C.), preferably greater than about 50° C.

The core portion may comprise a silicone rubber. The core monomers are preferably selected from isoprene, butadiene, styrene and siloxane. The polymeric material of the core portion may be selected from homopolymers of isoprene or butadiene. Copolymers of isoprene or butadiene with up to about 30 mol % (typically no more than 20 mol %, typically no more than 10 mol %) of a vinyl comonomer may also be used, particularly wherein the vinyl monomer is selected from styrene, alkylstyrene, acrylonitrile and an alkyl methacrylate (particularly butyl methacrylate). Preferably the core material is selected from polybutadiene-styrene copolymers and polybutadiene, and blends thereof. Preferably the polybutadiene-styrene copolymer comprising up to about 30 mol % (typically no more than 20 mol %, typically no more than 10 mol %) of styrene.

The polymeric material of the outer shell is preferably selected from homopolymers of styrene, alkylstyrene and alkylmethacrylate (preferably methyl methacrylate), and copolymers comprising at least 70 mol % of a monomer selected from styrene, alkylstyrene and alkylmethacrylate (preferably methylmethacrylate) and further comprising at least one comonomer selected from said other comonomers, vinyl acetate and acrylonitrile. The polymeric material of the outer shell may be functionalized by introducing therein (e.g. by grafting or as a comonomer during polymerisation) unsaturated functional monomers such as unsaturated carboxylic acid anhydrides, unsaturated carboxylic acids and unsaturated epoxides (for instance, maleic anhydride, (meth)acrylic acid and glycidyl methacrylate. The polymeric material of the outer shell may be cross-linked and optionally further comprises one or more cross-linkable monomer(s), as are known in the art, such as methacrylamide (MA), acrylamide, N-methylol methacrylamide and N-methylol acrylamide. A preferred polymeric material of the outer shell is a homopolymer or copolymer of methylmethacrylate, optionally functionalised and/or cross-linked, as described above.

A preferred core-shell particle comprises a core material of polybutadiene-styrene copolymer, and an outer shell which is a homopolymer or copolymer of methylmethacrylate optionally functionalised and/or cross-linked, as described above.

The core portion of the core-shell particle advantageously makes up from about 70 to 90 wt % of the core-shell particle and the shell portion from about 10 to about 30 wt %.

Commercially available core-shell particles suitable for use in the present disclosure include MX660 and MX411, manufactured by Kaneka, Corp.

The curable composition comprises no more than 5.0 wt %, preferably no more than about 4.0 wt %, preferably no more than about 3.0 wt %, preferably no more than about 2.0 wt %, preferably at least about 0.05 wt %, preferably at least about 0.1 wt %, preferably at least about 0.5 wt %, and typically from about 0.3 wt % to about 4.0 wt %, of core-shell particles by weight of the curable composition.

The core-shell particles have a particle size in the range of from about 50 nm to about 800 nm, preferably in the range of from about 100 nm to about 200 nm.

The core-shell particles may be in the form of a dry powder. Alternatively, the core-shell particles may be in the form of a composition (typically a concentrate or masterbatch) comprising the core-shell particles and a carrier component, preferably wherein the carrier component is selected from a thermoplastic polymer or an epoxy resin component as described herein, and preferably wherein the carrier component is the same as a thermoplastic polymer or an epoxy resin component already present in the curable composition as component (a) or (d).

Inorganic Particles

The curable composition comprises no more than 5.0 wt %, preferably no more than about 4.0 wt %, preferably no more than about 3.0 wt %, preferably no more than about 2.0 wt %, preferably at least about 0.05 wt %, preferably at least about 0.1 wt %, preferably at least about 1.0 wt %, and typically in the range of from about 0.1 to about 4.0 wt %, of inorganic particles by weight of the curable composition.

The inorganic particles have a particle size in the range of from about 2.0 nm to about 800 nm, and preferably at least about 10 nm, preferably no more than 500 nm, preferably no more than 200 nm, preferably no more than 100 nm, and typically no more than about 50 nm.

The inorganic particles may be in the form of a dry powder. Alternatively, the inorganic particles may be in the form of a composition (typically a concentrate or masterbatch) comprising the inorganic particles and a carrier component, preferably wherein the carrier component is selected from a thermoplastic polymer or an epoxy resin component as described herein, and preferably wherein the carrier component is the same as a thermoplastic polymer or an epoxy resin component already present in the curable composition as component (a) or (d). Any carrier component present in a composition comprising the inorganic particles may be the same as or different to any carrier component present in a composition comprising the core-shell particles.

The inorganic particles are preferably selected from particles of metal salts (for instance calcium carbonate) and metal oxides, more preferably from metal oxides and preferably from $SiO_2$, $TiO_2$ and $Al_2O_3$, and most preferably from silica. The particles may be referred to as nano-particles.

The inorganic particles may be selected from any suitable grade of such particles known and conventional in the art. For instance, several grades of nano-silica are commercially available. The nano-silica particles are preferably substantially spherical. The nano-silica particles may be chemically synthesised from aqueous sodium silicate solution.

Applications of the Curable Polymer Compositions and Cured Thermoset Resin Compositions The curable compositions described herein are suitable for fabrication of molded structural materials, and particularly suitable for fabrication of structures, including load-bearing or impact-resisting structures. The compositions may be used neat, but are typically are used to prepare composite materials further comprising reinforcing fibrous material.

The fiber reinforcement, fabric or pre-shaped fibrous reinforcement (or preform) may comprise any suitable reinforcing fibrous material conventional in the art. Fibres can be short or chopped, typically of mean fibre length not more than 2 cm, for example about 6 mm. Alternatively, and preferably, the fibres are continuous. Combinations of both short and/or chopped fibres and continuous fibres may also be utilised. The fibres may be in the form of, for example, uni-directionally disposed fibres, woven fabrics or braided, knitted (including multi-warp knitted fabrics and fully-fashioned knit fabrics), non-crimp fabrics, non-woven fabrics, or tapes. The fibrous material may be in the form of a preform. Fibres are typically used at a concentration of least 20%, especially from 30% to 70%, more especially 50 to 70% by volume, relative to the total volume of the composition comprising the resin system and reinforcing agent(s). The fibre can be organic, especially of stiff polymers such as poly paraphenylene terephthalamide, or inorganic. Among inorganic fibres, glass fibres such as "E" or "S" can be used, or alumina, zirconia, silicon carbide, other compound ceramics or metals. A very suitable reinforcing fibre is carbon, especially as graphite. The fibre is preferably unsized or is sized with a material that is compatible with the resin systems, in the sense of being soluble in the liquid precursor composition without adverse reaction or of bonding both to the fibre and to the thermoset/thermoplastic components.

Thus, as described above, the present disclosure provides a molded article comprising, or derived from, the curable composition defined herein. Preferably, the molded article is a composite material comprising, or derived from, the curable composition defined herein, and further comprising reinforcing fibrous material.

The curable compositions of the present disclosure find particular utility in the manufacture of components suitable for use in transport applications (including aerospace, aeronautical, nautical and land vehicles, and including the automotive, rail and coach industries), in building/construction applications or in other commercial applications. In the aerospace and aeronautical industry, the compositions may be used to manufacture primary and secondary parts of the aircraft, and particularly for primary parts (for example wing, fuselage, pressure bulkhead etc.).

Thus, the present disclosure provides a process for producing such a molded article or a cured thermoset resin from the curable composition according to the second aspect of the disclosure defined herein, comprising the steps of providing said curable composition and curing said curable composition.

The provision of the curable composition generally comprises an initial step of mixing the resin precursor component(s) with the toughening agents, optionally followed by a cooling step. Where the curable composition comprises a plurality of resin precursor components, two or more of said plurality of resin precursor components are typically pre-mixed prior to the addition of the toughening agents, and typically said pre-mixing is followed by a heating step (suitably at a temperature from above room temperature to about 80° C.) prior to the addition of the toughening agents. The toughening agents are preferably introduced by adding the thermoplastic component first, followed by the core-shell particles and the inorganic particles. Addition of the thermoplastic component is typically effected at above room temperature (suitably at a temperature of up to about 120° C.) until the thermoplastic has dissolved. After an optional cooling step (typically such that the mixture is at a temperature in the range of from about 70 to about 90° C.), the core-shell and inorganic particles are added, sequentially or simultaneously. It will be appreciated that the introduction of each additional component is accompanied by stirring or other mixing technique. The core-shell particles are preferably added as a masterbatch in a resin precursor component. Similarly, the inorganic particles are preferably added as a masterbatch in a resin precursor component. The resin precursor component of a masterbatch comprising the core-shell particles may be the same as or different to the resin precursor component of a masterbatch comprising the inorganic particles. A masterbatch may comprise one or more resin precursor component(s) and preferably comprises only a single resin precursor component. Alternatively, the core-shell particles and/or the inorganic particles may be added to the composition as a dry powder. In a further alternative, the core-shell particles and/or the inorganic particles may be compounded with the thermoplastic component prior to its mixing with the resin precursor component(s). Where the curable composition comprises a plurality of resin precursor components, one or more of the resin precursor components may be added into the composition at any stage during the preparation of the curable composition; thus for instance, where the curable composition comprises at least 3 (for instance 3 or 4) resin precursor components, then a plurality of said resin precursor components are preferably premixed as described hereinabove, and at least one (and typically only one) of the resin precursor components are introduced subsequently, for instance after the addition of at least one of said toughening agent(s), and particularly after the addition of all of said toughening agents. The curing agent(s) are then added, and the mixture is stirred until the curing agent has fully dissolved.

The curable composition is then injected into a mold, typically in which has been disposed reinforcing fibrous material, and the curable composition then cured at an elevated temperature to form the cured molded article.

Thus, the present disclosure preferably provides a liquid resin infusion (LRI) manufacturing process, preferably Resin Transfer Molding (RTM), more preferably Vacuum-Assisted Resin Transfer Molding (VARTM), comprising the steps of:
  (i) preparing a preform comprising reinforcing fibrous material;
  (ii) laying the preform within a mold;
  (iii) heating the mold to a predetermined temperature;
  (iv) providing a curable composition as defined herein;
  (v) injecting the curable composition into the mold, and
  (vi) curing said curable composition.

The process may be also be a liquid resin infusion process which is selected from the processes referred to in the art as Resin Infusion with Flexible Tooling (RIFT), Constant Pressure Infusion (CPI), Bulk Resin Infusion (BRI), Controlled Atmospheric Pressure Resin Infusion (CAPRI), Seemann Composites Resin Infusion Molding Process (SCRIMP), Vacuum-assisted Resin Infusion (VARI) or Resin Transfer Injection (RTI) used to manufacture composite articles.

The preform may comprise one or more layers of fabric comprising reinforcing fibrous material, as described herein.

The predetermined temperature of the mold is typically in the range of from about 90° C. to about 120° C., typically from about 100° C. to about 110° C.

Curing is suitably carried out at elevated temperature using a cure temperature ($T_C$) of up to 200° C., preferably at least 140° C., preferably at least 160° C., preferably in the range from 160 to 195° C., more preferably from 170 to 190° C., and more preferably from 175 to 185° C. The cure temperature ($T_C$) is attained by heating at a cure ramp rate ($R_{CR}$) which is preferably at least about 0.05° C./min, preferably at least about 0.1° C./min, preferably at least about 0.5° C./min, and typically up to about 5.0° C./min, typically up to about 3.0° C./min, more typically up to about 2.5° C./min, and preferably in the range of from about 0.5° C./min to about 2.5° C./min. The cure temperature is maintained for the required period, which is typically at least about 60 minutes and typically no more than about 500 minutes, and preferably at least about 90 minutes and preferably no more than about 180 minutes, and typically about 120 minutes. Typically, the cured resin is cooled, typically to ambient temperature, at a controlled rate (preferably in the range of from about 0.5° C./min to about 2.5° C./min, and typically at a rate of 2° C./min).

The preform may be sealed in the mold by at least a vacuum bag.

For improved processability of the curable composition, for instance wherein the composition exhibits the preferred viscosity characteristics described herein, it is preferred that the curable composition comprises:
(i) no more than about 3.0 wt %, preferably no more than about 2.0 wt % of said thermoplastic polymer by weight of the curable composition; and/or
(ii) no more than about 3.0 wt %, preferably no more than about 2.0 wt % of core-shell particles by weight of the curable composition; and/or
(iii) no more than 3.0 wt %, preferably no more than about 2.0 wt %, of i organic particles by weight of the curable composition, preferably wherein the curable composition satisfies at least criterion (i) above, and preferably wherein the curable composition satisfies at least two of criteria (i) to (iii) above (and preferably at least criterion (i)), and preferably all three of criteria (i) to (iii) above are satisfied.

According to a fourth aspect of the disclosure, there is provided the use of the curable composition defined herein in an LRI process, for the purpose of improving CSAI in a cured resin (particularly a composite material) produced from said curable composition in said LRI process, particularly for the purpose of improving CSAI without detriment to the processability of the curable composition and preferably for the purpose of improving CSAI while simultaneously improving processability of the curable composition. Preferably said use is for the purpose of improving CSAI while maintaining excellent compressive performance (particularly hot-wet open-hole compression (H/W-OHC) strength) in a cured resin (particularly a composite material) produced from said curable composition, particularly wherein the processability of said curable composition is at least maintained and preferably improved. Preferably, reference to improvement or retention of said properties is to the improvement or retention of a property relative to a material which does not contain the combination of thermoplastic component, core-shell particles and inorganic particles.

Thus, in the use according to the fourth aspect of the disclosure, the improvement is such that the CSAI of said cured resin (particularly said composite material) is at least 220, preferably at least 230, and more preferably at least 240 MPa, preferably wherein the H/W-OHC strength of said cured resin (particularly said composite material) is at least 190, preferably at least 195, preferably at least 200, preferably at least 205, preferably at least 210 MPa, and/or preferably wherein the initial viscosity of said curable composition is no more than 5 Poise at a temperature within the temperature range of from about 80° C. to about 130° C. (preferably at 120° C.) and the viscosity of said curable composition after 3 hours at a temperature within the temperature range of from 80° C. to 130° C. (preferably at 120° C.) is no more than 5 Poise.

As used herein, the terms "excellent hot-wet compressive performance" or "excellent hot-wet open-hole compression (H/W-OHC) strength" refer to an H/W-OHC strength of at least 190, preferably at least 195, preferably at least 200, preferably at least 205, preferably at least 210 MPa in the test method described herein.

Preferably, the molded article (preferably the composite material) defined herein exhibits a CSAI of at least 210, more preferably at least 220, more preferably at least 230, and more preferably at least 240 MPa in the test method described herein.

The disclosure is now illustrated in non-limiting manner with reference to the following examples.

EXPERIMENTAL

The physical properties and behaviour of the resin systems described herein are measured according to the following techniques.

Glass Transition Temperature

The glass transition temperature is defined as the temperature where the sample exhibits a dramatic change in mechanical and damping behaviour with increasing temperature when subjected to an oscillating displacement. The Tg onset is defined as the temperature intersection of extrapolated tangents drawn from points on the storage modulus curve before and after the onset of the glass transition event. The test was performed using TA Q800 in a single cantilever bending mode in the range of temperatures between about 50° C. and 300° C., with a heating rate of 5±0.2° C./min and 1 Hz frequency.

Particle Size

Particle size was measured by dynamic light scattering using a Malvern Zetasizer 2000. Reference herein to particle size is to the median (d50) of the particle size distribution, the value on the distribution such that 50% of the particles have a particle size of this value or less. The particle size is suitably a volume-based particle sized, i.e. d(v,50)

Viscosity

Dynamic temperature ramp viscosity of the resin formulations was measured according to the method of ASTM D4440. Steady temperature viscosity of the resin formulations was measured according to the method of ASTM D4287.

Molar Mass

The molar mass, principally of the thermoplastic component, is measured by Gel Permeation Chromatography relative to a polystyrene standard.

Mechanical Testing

Mechanical performance was measured in terms of compressive performance (open hole compression (OHC) strength) and impact resistance (compression strength after impact (CSAI).

In order to measure Compression Strength After Impact (CSAI), the composite material is subject to an impact of a given energy (30 Joule impact) and then loaded in compression in an anti-buckling jig, and the residual compressive strength measured. Damage area and dent depth are measured following the impact and prior to the compression test. During this test, the composite material is constrained to ensure that no elastic instability is taking place and the strength of the composite material is recorded. In this work, CSAI (in MPa) was measured according to the ASTM D7136-7137 test method.

Open-hole compression strength (in MPa) was measured according to the ASTM D6484 test method. OHC measurements were taken at room temperature (approx. 20° C.; RT-OHC). Hot-wet compressive performance (H/W-OHC strength) was assessed by measuring OHC strength at 160° F. (approx. 71.1° C.) after soaking the samples for 14 days in water at 160° F. (approx. 71.1° C.).

Resin systems were prepared and analysed according to the test procedures described above,

EXAMPLES

A series of resin systems was formulated using the components shown in Table 1 below. Comparative Example 1 is a resin formulation according to WO-2011/077094-A.

TABLE 1

| | Epoxy resin precursors | | | | Toughening additives | | | Cure |
|---|---|---|---|---|---|---|---|---|
| | | | | | Core-shell rubber particles Kaneka | Nano-silica | PES thermo-plastic | |
| Resin | PY306 (%) | MY0510 (%) | MY0610 (%) | MY721 (%) | MX411 (%) | Nanopox F520 (%) | 5003P (%) | agent MCDEA |
| C. Ex. 1 | 8.09 | 16.19 | 16.19 | 6.04 | 2.02 | 0 | 3.22 | 48.24 |
| Ex. 1 (low) | 7.41 | 16.6 | 16.6 | 7.03 | 2.17 | 0.27 | 0.51 | 49.42 |
| Ex. 2 (medium) | 5.25 | 16.43 | 16.43 | 2.34 | 6.44 | 3.73 | 0.50 | 48.91 |
| Ex. 3 (high) | 0.85 | 9.10 | 9.10 | 0 | 26.47 | 9.94 | 3.97 | 40.57 |

The following materials were used:
Araldite® PY306, a diglycidylether of bisphenol F (DGEBF) with a specific content of epoxide groups of from 5.99 mol/kg to 6.41 mol/kg (an "epoxy equivalent weight" of from 156 g/mol to 167 g/mol) from Huntsman Advanced Materials.
Araldite® MY0510, a O,N,N-triglycidyl para-aminophenol (TGPAP) with a specific content of epoxide groups of from 9.35 mol/kg to 10.53 mol/kg (an "epoxy equivalent weight" of from 95 g/mol to 107 g/mol) from Huntsman Advanced Materials.
Araldite® MY721, a N,N,N',N'-tetraglycidyl diaminodiphenylmethane (TGDDM) with a specific content of epoxide groups of from 8.70 mol/kg to 9.17 mol/kg, (an "epoxy equivalent weight" of from 109 g/mol to 115 g/mol) from Huntsman Advanced Materials.
Araldite® MY0610, a O,N,N-triglycidyl meta-aminophenol (TGMAP) (epoxy equivalent weight of from 94 g/mol to 102 g/mol) from Huntsman Advanced Materials.
Sumikaexele 5003P a functionalized polyethersulfone (PES) thermoplastic polymer from Sumitomo.
Kaneka® MX411: a masterbatch of core-shell rubber particles (particle size of 100 nm) (15 wt %) in Araldite® MY721.
Nanopox® F520: a masterbatch of nano-silica particles (40 wt %) in Araldite® PY306.

The compositions were prepared as follows. The PY306, MY0510 and MY0610 epoxy precursor components were combined at room temperature and heated to 60° C. with stirring. The 5003P PES thermoplastic component was added and the temperature was raised to 115° C. with further stirring. When the temperature reached 115° C., the mixture was held for 30 minutes until the PES thermoplastic has dissolved. The mixture was cooled with stirring to 80° C., at which point core-shell rubber and nanosilica masterbatches were added along with the MY721 epoxy precursor component, with further stirring. MCDEA was then added and the mixture was stirred until the MCDEA has fully dissolved.

The viscosity of the resin formulations was tested in accordance with the test method described above, and the results are shown in Table 2 below.

Composite materials were then prepared in a VARTM process by injecting each of the above resin formulations into a mold containing carbon fibre fabric (T300 3k Plain Weave reinforcement (196 gsm) fabric) as follows. 80 g of resin was placed into a 6"×4" mold, warmed to about 90 to 110° C. and degassed using a vacuum oven. The mold and its contents were then transferred to a fan oven where they were heated from the starting temperature (about 90 to 110° C.) up to 180° C. at a rate of 2° C./min and held isothermally for 2 hours before being allowed to cool to room temperature at a rate of 2° C./min.

The cured laminates were analysed according to the test methods described above and the results are shown in Table 2 below,

TABLE 2

| | C. Ex. 1 | Ex. 1 | Ex. 2 | Ex. 3 |
|---|---|---|---|---|
| RT OHC strength (MPa) | 269.2 | 266.5 | 289.1 | 253.7 |
| H/W OHC strength (MPa) | 206.2 | 216.9 | 208.1 | 197.2 |
| CSAI (MPa) | 209.9 | 223.5 | 242.0 | 230.4 |
| Dent Depth | 1.8 | 0.41 | 0.35 | 0.07 |
| Damaged area | 1224 | 922 | 701 | 796 |
| Initial viscosity at 120° C. (poise) | 0.58 | 0.18 | 0.17 | 1.8 |
| Viscosity at 120° C.; 3 hrs (poise) | 1.53 | 0.39 | 0.42 | >3.75* |

*Exceeded 4 Poise before 3 hr isothermal time completed

The results demonstrate that the improved resin formulations of the present disclosure provide composite materials which exhibit surprisingly improved CSAI. The composites made from the resin formulations of the present disclosure exhibit a smaller damaged area and lower dent depth. In addition, the composites exhibit excellent H/W OHC strength, which is maintained or improved.

Figure 3:
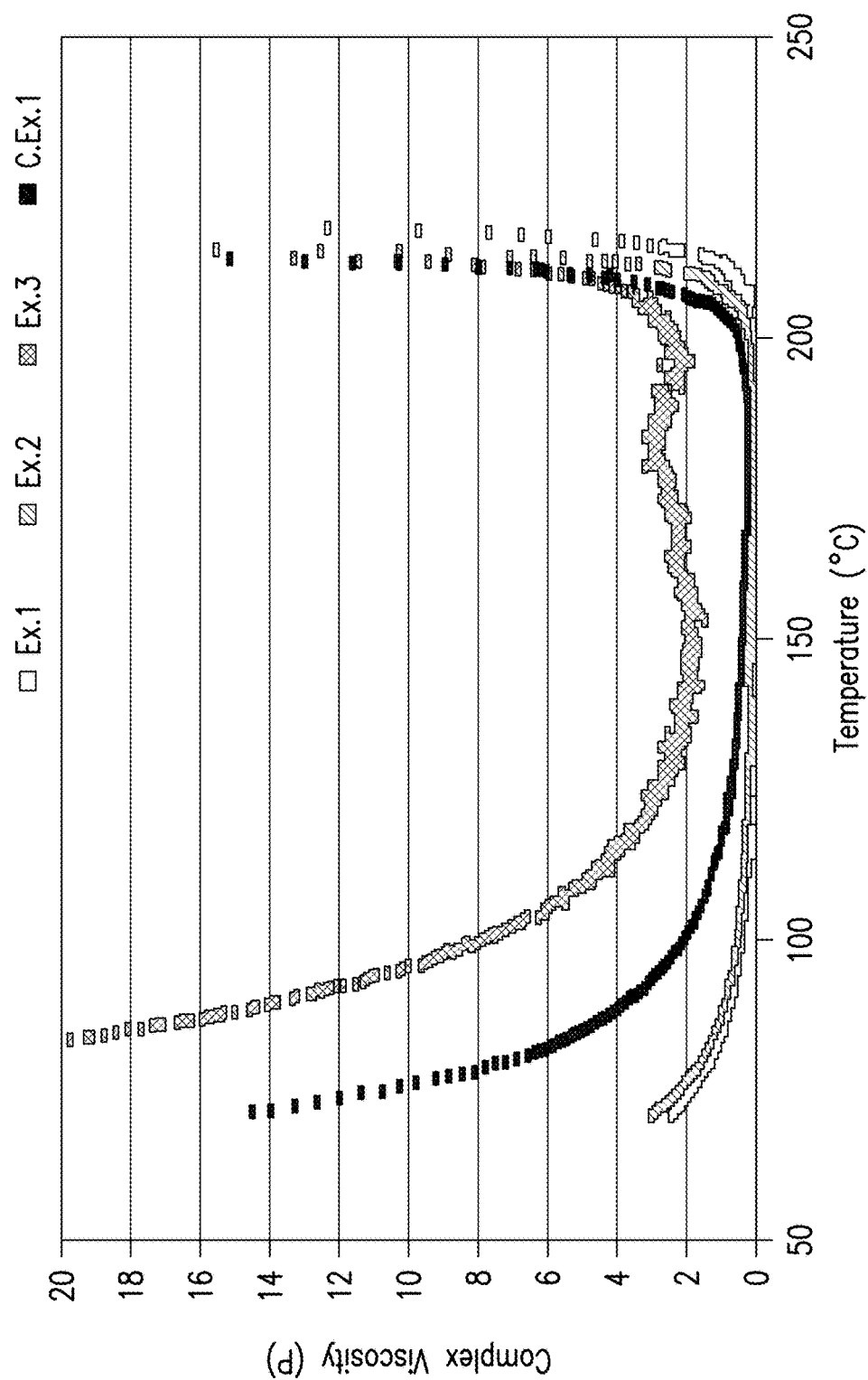
FIG. 3 shows the viscosity as a function of temperature for four different resin formulations.

Moreover, the resin formulations 1 and 2 exhibit lower viscosity, which is more stable for longer periods, and hence possess superior processability. The resin formulation of Example 3 exhibits a relatively higher viscosity, more akin to that of Comparative Example 1, demonstrating that where improved processability is required in addition to improved CSAI and at least comparable H/W OHC strength, then formulations closer to Examples 1 or 2 are more desirable. FIG. 3 shows the viscosity as a function of temperature for the four examples. Examples 1 and 2 exhibit favourable low viscosities even at the lower temperatures in the range, hence maintaining or extending pot-life.

The resin laminates were analysed by transmission electron microscopy as described above. The morphology of Example 1 is shown in FIG. 1, which shows the self-assembly of inorganic particles (4) around the outer surface of a phase separated thermoplastic domain (2) in the cured resin (1) further comprising core-shell particles (3).

Figure 2:
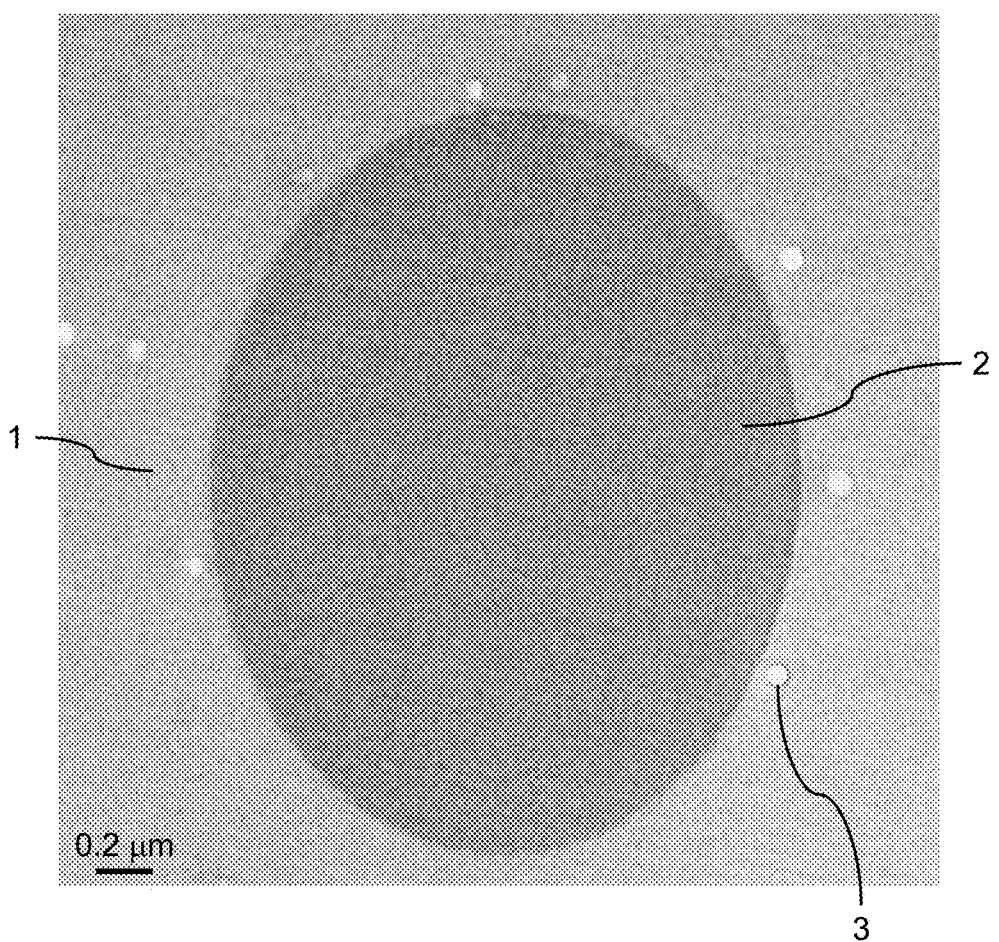
FIG. 2 shows the morphology of a cured resin which is similar to that shown in FIG. 1 but does not contain nano-silica particles.

FIG. 2 shows the morphology of a sample similar to Comparative Example 1, which contained no nano-silica particles. FIG. 2 shows the phase separated thermoplastic domain (2) in the cured resin (1) further comprising core-shell particles (3). FIG. 2 shows that removal of the nano-silica from the resin formulation results in the loss of the novel morphology, and this is accompanied by loss of the improvement in CSAI performance.

The invention claimed is:

1. A liquid resin infusion (LRI) manufacturing process for producing a molded article, comprising the steps of providing a curable composition, injecting said curable composition into a mold, and curing said curable composition, wherein the curable composition comprises:
   a) a thermoplastic polymer in an amount up to 5.0 wt %, said thermoplastic polymer being selected from: polyarylethers, polyarylsulphides, polyarylsulphones, and copolymers thereof;
   b) core-shell particles in an amount up to 5.0 wt %, wherein said core-shell particles have a particle size in the range of from about 50 nm to about 800 nm;
   c) inorganic particles in an amount up to 5.0 wt %, wherein said inorganic particles have a particle size in the range of from about 2.0 nm to about 800 nm;
   d) an epoxy resin component which comprises one or more epoxy resin precursor(s); and
   e) one or more amine curing agent(s),
   wherein the initial viscosity of said curable composition is no more than 5 Poise at a temperature within the temperature range of from about 80° C. to about 130° C.,
   wherein the molded article exhibits a self-assembled shelled morphology of inorganic particles around phase-separated thermoplastic polymer domains, and said self-assembled shelled morphology of inorganic particles around phase-separated thermoplastic polymer domains is generated in situ during curing.

2. A process according to claim 1 wherein the thermoplastic polymer and the epoxy resin component form a continuous phase in the curable composition.

3. A process according to claim 1, wherein said viscosity of the curable composition is no more than 2 Poise, wherein said viscosity is measured at a temperature of 120° C.

4. A process according to claim 1, wherein the viscosity of said curable composition after 3 hours at a temperature within the temperature range of from 80° C. to 130° C. is no more than 5 Poise.

5. A process according to claim 1, wherein the molded article is a composite material comprising reinforcing fibrous material.

6. A process according to claim 1 further comprising:
   (i) preparing a preform comprising reinforcing fibrous material;
   (ii) laying the preform within a mold;
   (iii) optionally, heating the mold to a predetermined temperature;
   (iv) providing said curable composition;
   (v) injecting the curable composition into the mold, and
   (vi) curing said curable composition.

7. A process according to claim 6, wherein the preform comprises one or more layers of fabric comprising reinforcing fibrous material.

8. A process according to claim 1, wherein the mold is heated to a predetermined temperature in the range of from about 90° C. to about 120° C.

9. A process according to claim 1, wherein curing is performed at a cure temperature ($T_c$) in the range from about 160° C. to about 200° C.

10. A process according to claim 1, wherein the thermoplastic polymer is polyarylethersulphone (PES) or polyaryletherethersulphone (PEES) or PES-PEES copolymer.

11. A process according to claim 1, wherein the thermoplastic polymer is selected from polyarylethersulphone thermoplastic polymers comprising ether-linked repeating units, optionally further comprising thioether-linked repeating units, the units being selected from:

and optionally from:

wherein:
   Ar is phenylene;
   n=1 to 2 and can be fractional;
   a=1 to 3 and can be fractional and when a exceeds 1, said phenylene groups are linked linearly through a single chemical bond or a divalent group other than —SO$_2$—, or are fused together, provided that the repeating unit —[ArSO$_2$Ar]$_n$— is always present in the polyarylethersulphone in such a proportion that on average at least two of said —[ArSO$_2$Ar]$_n$— units are in sequence in each polymer chain present,
   and wherein the polyarylethersulphone has one or more reactive pendant and/or end group(s).

12. A process according to claim 1, wherein the epoxy resin component comprises one or more epoxy resin precursor(s) having at least two epoxide groups per molecule.

13. A process according to claim 1, wherein the epoxy resin component is a blend of epoxy resin precursors having different functionality, wherein said blend comprises one or more epoxy resin precursors having two epoxide groups per molecule, and one or more epoxy resin precursors having three or four epoxide groups per molecule.

14. A process according to claim 13, wherein the epoxy resin component comprises a blend of di-functional, tri-functional and tetra-functional epoxy resin precursors.

15. A process according to claim 1, wherein the epoxy resin component comprises at least one epoxy resin precursor selected from: the diglycidyl ether of bisphenol A (DGEBA); the diglycidyl ether of bisphenol F (DGEBF); O,N,N-triglycidyl-para-aminophenol (TGPAP); O,N,N-triglycidyl-meta-aminophenol (TGMAP); and N,N,N',N'-tetraglycidyldiaminodiphenyl methane (TGDDM), and blends thereof.

16. A process according to claim 1, wherein said amine curing agent(s) are selected from: 4,4' methylenebis-(3-chloro, 2,6-diethyl)-aniline (MCDEA); 4,4' methylenebis-(2,6-diethyl)-aniline (MDEA); 4,4'-methylenedianiline (MDA); and 3,3'- and 4-,4'-diaminodiphenylsulphone (DDS); and combinations thereof.

17. A process according to claim 1, wherein the epoxy resin component and the amine curing agent are present in the composition in amounts sufficient to provide a molar ratio of amine groups present in the curing agent to epoxy groups present in the epoxy component of from about 0.75:1 to about 1:0.75.

18. A process according to claim 1, wherein the curable composition comprises from about 0.5 wt % to about 4.0 wt % of said thermoplastic polymer.

19. A process according to claim 1, wherein the curable composition comprises from about 0.3 wt % to about 4.0 wt % core-shell particles and said core-shell particles have a particle size in the range of from about 100 nm to about 200 nm.

20. A process according to claim 1, wherein the core-shell particles comprise:

an inner core portion which is a polymeric material selected from homopolymers of isoprene or butadiene, and from copolymers of isoprene or butadiene with up to about 30 mol % of a vinyl comonomer; and an outer shell portion which is a polymeric material selected from homopolymers of styrene, alkylstyrene and methyl methacrylate, and from copolymers comprising at least 70 mol % of a monomer selected from styrene, alkylstyrene and methylmethacrylate and further comprising at least one different comonomer selected from styrene, alkylstyrene, methylmethacrylate, vinyl acetate and acrylonitrile, wherein said polymeric material of the outer shell portion is optionally functionalized by introducing therein one or more unsaturated functional monomers.

21. A process according to claim 1, wherein said inorganic particles are selected from calcium carbonate, silica ($SiO_2$), $TiO_2$ and $Al_2O_3$.

22. A process according to claim 21, wherein said inorganic particles are silica particles.

23. A process according to claim 1, wherein the curable composition comprises from about 0.1 wt % to about 4.0 wt % inorganic particles and said inorganic particles have a particle size in the range of from about 2.0 nm to about 100 nm.

* * * * *